United States Patent
Klieber (10) Patent No.: US 8,931,793 B2
(45) Date of Patent: Jan. 13, 2015

(54) FRAME ELEMENT OF A SUSPENSION-MOUNTED TWO-WHEELED VEHICLE FRAME FOR GUIDING A CABLE

(76) Inventor: Jochen Klieber, Tacherting (DE)

( * ) Notice: Subject to any disclaimer, the term of this patent is extended or adjusted under 35 U.S.C. 154(b) by 147 days.

(21) Appl. No.: 13/255,852

(22) PCT Filed: Mar. 11, 2010

(86) PCT No.: PCT/EP2010/053062
§ 371 (c)(1),
(2), (4) Date: Sep. 27, 2011

(87) PCT Pub. No.: WO2010/103057
PCT Pub. Date: Sep. 16, 2010

(65) Prior Publication Data
US 2012/0091684 A1    Apr. 19, 2012

(30) Foreign Application Priority Data
Mar. 12, 2009 (DE) .......................... 10 2009 012 765

(51) Int. Cl.
| | |
|---|---|
| B62K 19/00 | (2006.01) |
| B62K 19/34 | (2006.01) |
| B62K 25/28 | (2006.01) |
| B62J 6/18 | (2006.01) |
| B62K 19/30 | (2006.01) |
| B62K 25/30 | (2006.01) |

(52) U.S. Cl.
CPC . *B62J 6/18* (2013.01); *B62K 19/30* (2013.01); *B62K 25/28* (2013.01); *B62K 25/30* (2013.01)
USPC ............ 280/283; 280/275; 280/284; 280/288

(58) Field of Classification Search
USPC ......... 280/283, 274, 275, 276, 277, 278, 280, 280/281.1, 282, 284, 285, 286, 287, 288, 280/288.3; 180/227
See application file for complete search history.

(56) References Cited

U.S. PATENT DOCUMENTS

| | | | |
|---|---|---|---|
| 4,201,397 A | 5/1980 | Mtthias | |
| 4,634,138 A | 1/1987 | Fryer et al. | |
| 5,125,678 A | 6/1992 | Bogen | |
| 5,417,445 A * | 5/1995 | Smart | 280/275 |
| 5,658,001 A | 8/1997 | Blanchard | |
| 6,974,144 B2 * | 12/2005 | Horiuchi | 280/276 |
| 7,000,936 B2 * | 2/2006 | Schmider | 280/281.1 |

(Continued)

FOREIGN PATENT DOCUMENTS

| | | |
|---|---|---|
| DE | 28 03 565 A1 | 8/1978 |
| DE | 37 01 803 A1 | 8/1988 |
| DE | 196 20 457 A1 | 11/1997 |
| EP | 1 504 987 A2 | 2/2005 |
| EP | 1 743 829 A1 | 1/2007 |
| EP | 1 787 899 A1 | 5/2007 |
| GB | 1062932 | 3/1967 |
| WO | WO 99/15396 | 4/1999 |

OTHER PUBLICATIONS

International Search Report, dated Apr. 28, 2010, corresponding to PCT/EP2010/053062, 8 pages.
International Preliminary Report of Patentability and Written Opinion of corresponding PCT/EP2010/053062, dated Sep. 13, 2011, 13 pages.
EPO Examination Report dated Aug. 30, 2013, issued in corresponding EP application No. 10707911.3, listing cited references (9 pages).

*Primary Examiner* — Joseph M Rocca
*Assistant Examiner* — Marc A Scharich
(74) *Attorney, Agent, or Firm* — Christie, Parker & Hale, LLP (57) ABSTRACT

The invention relates to the guiding of lines, or cables, on a two-wheeled vehicle frame. The guiding is carried out with a guide device on a frame element on which an additional frame element is movably supported in such a way that the line essentially intersects the rotational axis of the bearing.

12 Claims, 7 Drawing Sheets

(56) References Cited

U.S. PATENT DOCUMENTS

| | | |
|---|---|---|
| 7,377,535 B2* | 5/2008 | Chamberlain ................ 280/284 |
| 7,396,032 B2* | 7/2008 | Horiuchi ...................... 280/279 |
| 2005/0253357 A1 | 11/2005 | Chang et al. |
| 2006/0055146 A1* | 3/2006 | Ueno ........................... 280/280 |
| 2006/0145446 A1* | 7/2006 | Schmider ................... 280/281.1 |
| 2007/0014120 A1 | 1/2007 | Kitamura |
| 2007/0108723 A1* | 5/2007 | Fukui ............................ 280/276 |
| 2009/0058038 A1* | 3/2009 | Dodman et al. .............. 280/274 |
| 2010/0207351 A1* | 8/2010 | Klieber ......................... 280/278 |
| 2011/0121538 A1* | 5/2011 | Giroux ......................... 280/280 |

\* cited by examiner

FRAME ELEMENT OF A SUSPENSION-MOUNTED TWO-WHEELED VEHICLE FRAME FOR GUIDING A CABLE

CROSS-REFERENCE TO RELATED APPLICATION(S)

This application is a National Phase Patent Application and claims the priority to and benefit of International Application Number PCT/EP2010/053062, filed on Mar. 11, 2010, which claims priority of German Patent Application Number 10 2009 012 765.8, filed on Mar. 12, 2009.

FIELD OF THE INVENTION

The invention relates to the guiding of cables or lines on two-wheeled vehicles. The invention relates in particular to a frame element of a suspension-mounted two-wheeled vehicle frame for guiding a cable on the two-wheeled vehicle frame, a bicycle having a frame element, and a method for mounting and guiding a cable on a frame element of a suspension-mounted two-wheeled vehicle frame.

TECHNOLOGICAL BACKGROUND

To enhance riding comfort and to increase rider safety, in addition to suspension forks bicycle frames are also provided with suspension-mounted and damped rear end assemblies. By various frame designs, impacts resulting from uneven areas on the roadway are compensated for by dynamics of the rear end and front end which are largely independent of one another.

In addition to the increased comfort, the suspension of the rear end also entails numerous problems. The overall bicycle basically loses rigidity on account of separating the rear assembly from the frame. As a result, compared to nonsuspension-mounted frames, full suspension-mounted frames often have higher weight and require more maintenance, for example on the rear damping element and its control system. In addition, the motion of the rear end during contraction and extension affects the drive of the bicycle. The manufacturers of suspension elements have attempted to address these problems through a series of design measures.

SUMMARY OF THE INVENTION

It is an object of the invention to provide improved guiding of lines or cables on two-wheeled vehicles.

A frame element of a suspension-mounted two-wheeled vehicle frame for guiding a cable or line on the two-wheeled vehicle frame or on the frame element and optionally at least partially in the frame element, a bicycle having a frame element, and a method for mounting and guiding a cable on a frame element of a suspension-mounted two-wheeled vehicle frame are provided according to the features of the independent claims. Refinements of the invention result from the subclaims.

The described exemplary embodiments likewise relate to the frame element, the bicycle, and the method.

DEFINITIONS

Within the context of the invention, the term "frame element" may be understood to mean, for example, a down tube, a top tube, a seat tube, a chain stay, a brace, a rocker, or a swing arm. Each of these elements is part of a two-wheeled vehicle frame. Likewise, any possible combination of these components of the two-wheeled vehicle frame may be understood to mean a "frame element."

Furthermore, within the context of the invention the term "cable" or "line" is used, for example, for a Bowden cable having an appropriate outer sheath, for a hydraulic line, a pneumatic line, or an electrical line.

Furthermore, within the context of the invention a "fastening element" may be designed as a separate component. However, a design as a component which is fixedly connected to the frame element, for example by welding, is also possible. The key aspect of the term is that the "fastening element" is designed for accommodating and fixing the additional frame element to the frame element.

Furthermore, within the context of the invention the term "guide device" is used for a mechanical component which is mounted on a two-wheeled vehicle frame for purposes of spatially guiding the cable or line. The guide device may be, for example, a component which is welded or soldered to the two-wheeled vehicle frame, by which the line is guided along a desired spatial progression. The "guide device" may also be a channel, a borehole within a frame element, or a guide tube which is introduced as an insert into openings or boreholes in the frame element. The key aspect of all these exemplary embodiments of the "guide device" is that the line or cable is guided in a desired manner.

The term "distance of the surface of the cable from the rotational axis" is understood to mean that there is no parallel orientation of the cable with respect to the rotational axis. Instead, either the cable intersects the rotational axis at an intersection point, which corresponds to a distance of 0 mm between the two, or the cable and the rotational axis are situated obliquely, i.e., at an angle with respect to one another in space, in which case the distance is the shortest distance between the surface of the cable and the rotational axis.

The term "rotational axis" includes a tangible, real axis, but may also be an intangible, abstract spatial rotational axis.

According to one exemplary embodiment of the invention, a frame element of a suspension-mounted two-wheeled vehicle frame is provided for guiding a line or cable on the two-wheeled vehicle frame (and therefore, also on the frame element). The frame element has a guide device for guiding the line on the two-wheeled vehicle frame, the frame element being designed for the movable mounting of an additional frame element by means of a bearing. The line also has an outer surface. Furthermore, in the guided state, the distance of the outer surface of the line from a rotational axis of the bearing is between 0 and 10 mm.

In other words, the cable or line on the frame element, and thus on the two-wheeled vehicle frame, is guided by the guide device in such a way that it essentially intersects the rotational axis of the bearing. The line may be guided by the guide device, for example perpendicular to the rotational axis.

Due to the passage of the line through the rotational axis or through a cylindrical region having a radius of 10 mm about the rotational axis, elongation of the line during a motion of the two frame elements with respect to one another may be prevented. As a result of this minimized or prevented elongation of the line, undesired effects on the components of the two-wheeled vehicle which are controlled by the line may be prevented. These components may be, for example, brakes, gear shifters, damping elements, or devices for changing the seat height.

The distance of the surface of the line from the rotational axis may also be in the range between 0 and 15 mm if a frame design in question causes no appreciable tensile elongation at a distance of 15 mm. One important aspect of the invention is that the distance from the rotational axis is selected such that an average motion of the two frame elements relative to one another does not result in elongation of the line, which, for example, causes undesired shifting at a rear derailleur of the two-wheeled vehicle. In addition, mechanical abrasion on the two-wheeled vehicle frame and on the line may be prevented or minimized due to the guiding of the line according to the invention.

The two frame elements are mounted by means of the bearing so as to be movable with respect to one another, for example to allow a relative motion of a front end of the two-wheeled vehicle with respect to a rear end of the two-wheeled vehicle. The elongation of the line caused by such a motion, or the mechanical abrasion on the frame and/or the line due to a motion of the line caused by the motion of the frame elements, may be minimized or prevented by the invention.

If desired, the frame element may likewise have the bearing. The bearing, for example, may have a continuous tangible rotational axis which is designed as a metal axle, for example. For guiding through the rotational axis, a borehole, for example, may be present in the rotational axis, through which the line is guided. However, guiding of the line which occurs at a distance from the rotational axis and achieves the desired effect described above is also possible.

Furthermore, the two-wheeled vehicle may be a bicycle, and the two-wheeled vehicle frame may be a bicycle frame.

According to another exemplary embodiment of the invention, the frame element is a front end of the suspension-mounted two-wheeled vehicle frame, and the additional frame element is a swing arm of the suspension-mounted two-wheeled vehicle frame.

The front end may include, for example, the down tube, seat tube, top tube, steering tube, bottom bracket bearing housing, and a fastening element or a fastening area for the rear end. On the other hand, the swing arm may be understood to be a part of the rear end, which replaces the chain stays in the case of a full suspension-mounted two-wheeled vehicle having a four-bar linkage. The swing arm is mounted on the fastening element or on the fastening area of the front end by means of a one- or two-part swing arm bearing, for example, and at the same time is rotatably supported. The swing arm may be mounted on the fastening element in the region of the bottom bracket bearing, for example.

According to another exemplary embodiment of the invention, the bearing is a two-part main bearing of the swing arm, having a first part and a second part. In addition, the guiding of the line takes place between the first part and the second part of the main bearing.

A right section of the swing arm, which corresponds to a right chain stay, may be mounted on the front end via a first part of the swing arm main bearing. A left second part of the swing arm, which corresponds to the left chain stay, may be mounted in a rotatably supported manner on the front end of the two-wheeled vehicle frame via the second part of the swing arm main bearing. It is possible that it is not necessary to use a tangible rotational axis between the first and the second part of the main bearing of the swing arm. However, this rotational axis is present in a spatially abstract sense between the first and the second part of the main bearing of the swing arm, and describes a rotation of the swing arm about this axis. In other words, it is possible to provide an empty space between the first and the second part of the main bearing of the swing arm, through which the line may be guided via the guide device without taking further precautions.

According to another exemplary embodiment of the invention, the swing arm has two channel openings and a channel, the channel extending between the two channel openings, and the channel being designed for guiding the cable.

To allow the cable or line to be further protected from mechanical effects and weather influences such as soiling, for example, after it has passed the rotational axis of the bearing at the distance of 0 to 10 mm according to the invention, the line is inserted into the swing arm through a first channel opening. In addition, the line extends along and inside the entire channel, and exits at the second channel opening in order to be guided to the component to be controlled, for example a derailleur, a brake, a damping element, or a seat device.

According to another exemplary embodiment of the invention, the frame element has a seat tube having at least one first opening, and a fastening element for mounting the bearing. The fastening element has at least one second opening, and in the guided state the cable extends through the first opening in the seat tube and through the second opening in the fastening element.

Thus, in this exemplary embodiment of the invention the frame element is understood to be the seat tube of a two-wheeled vehicle frame and the down tube of a two-wheeled vehicle frame, the down tube in turn having the fastening element and the bottom bracket bearing housing. For example, the bottom bracket bearing housing having the fastening element may be welded to the down tube. In this case, the fastening element may also be understood to be the fastening area of the frame element. Thus, it may be said that the fastening element is an integral component of the frame element after being welded on, for example, and the additional frame element is mounted by means of the bearing in this fastening area of the frame element.

The fastening element is characterized in that the additional frame element may be movably connected to the frame element by the bearing which is mounted on the fastening element. The other frame element may, for example, be a part of the rear end of the two-wheeled vehicle frame, for example a swing arm. In this case the fastening element may be referred to as a swing arm holder. In the present exemplary embodiment, the guide device may be provided by a channel and/or a guide tube (insert) which passes through the seat tube and subsequently extends through the fastening element. This exemplary embodiment is described in greater detail in the following figures.

It is also possible for the seat tube to have multiple openings, so that the channel or a first part thereof may extend between two openings. An insert such as a guide tube may then be introduced into this channel. If desired, the fastening element may also have multiple openings for guiding the line, so that, for example, a linear channel extends from the first opening in the seat tube, through the seat tube, and through the fastening element until reaching the second opening in the fastening element. In other words, a linear guide channel may be provided which comprises two subchannels, one in the seat tube and one in the fastening element. Nonlinear guides are also possible.

Furthermore, the guiding of the cable may be achieved solely through the walls of the seat tube and the walls of the fastening element, the walls thus acting as guide devices.

The openings may be designed as boreholes which may but do not have to be circular.

In this and every other exemplary embodiment, the guiding of the cable may extend within the frame element. For example, the line may be guided through the seat tube and through the fastening element, so that it is guided beneath the visible surface of the two-wheeled vehicle frame. The line may thus be effectively protected from external mechanical effects and weather influences.

According to another exemplary embodiment of the invention, the cable runs outside the seat tube and through the bearing.

According to another exemplary embodiment of the invention, the second opening is designed for the cable to exit from the fastening element.

This second opening may be located, for example, in the rear area between the rear wheel of the two-wheeled vehicle and the bottom bracket bearing. This allows continuous guiding of the line out of the fastening element with subsequent relaying and guiding of the line in further guide devices, for example a channel in a swing arm.

According to another exemplary embodiment of the invention, the distance of the second opening from the rotational axis is 0 to 30 mm and, for example, is selected from the group comprising 0 to 10 mm, 10 to 20 mm, and 20 to 30 mm.

A motion of the line in the region of the exit from the second opening may be brought about by a relative motion between the frame element and the additional frame element. To avoid mechanical contact between the surface of the line and the inner wall of the opening, the opening may be placed as close as possible to the rotational axis. Since the motion of the line occurs only in a rear second section of the line, mechanical contact and therefore disadvantageous abrasion on the frame or the line can result only in this rear section.

In other words, the cable may be divided into two regions. The cable has a first, front region and a second, rear region. Within the context of the invention, the terms "front" and "rear" in the reference system of the two-wheeled vehicle frame are defined as follows: the first front part of the cable begins at the rotational axis and extends to the front end of the two-wheeled vehicle, toward the front wheel. The second rear part of the cable likewise begins at the rotational axis and extends to the rear end of the bicycle, toward the rear wheel. Due to the guiding of the cable according to the invention, it may be achieved that during a relative motion of the frame element with respect to the additional frame element, only the second part of the cable undergoes motion, which does not cause elongation of the cable. Likewise, mechanical abrasion due to motions of the cables may be avoided.

In other words, the second opening is located at the level of the rotational axis (or at a distance according to the stated ranges), so that the second region of the cable, which may be set in motion by a motion of the two frame elements with respect to one another, completely exits from the frame element. However, this exemplary embodiment also provides that the opening extends over a region of 0 to 10 mm, 10 to 20 mm, or 20 to 30 mm into this second movable part of the cable. In each case, the starting point of this distance measurement is the rotational axis of the bearing.

If the second opening has a wall thickness with an inner side and an outer side, it is the distance from the rotational axis to the inner side that is meant. The inner side of the opening faces into the fastening element.

In other words, due to the placement of the second opening as close as possible to the rotational axis, it may be achieved that the moving part of the line results in no contact between the opening and the cable or line, even with maximum deflection of an average expected motion of the two frame elements relative to one another.

According to another exemplary embodiment of the invention, a first surface of the second opening has a shape such that contact between the cable and the first surface is avoided during a motion of the frame element relative to the additional frame element.

The motion may be any relative motion of the two frame elements with respect to one another. In other words, the shape of the opening is such that contact does not result between the line and the surface of the opening during an average motion of the two frame elements relative to one another and the resulting motion of the second region of the line. This prevents disadvantageous abrasion on the line as well as on the two-wheeled vehicle frame.

Since the amplitude of the motion of the cable (in the second region) may increase with the distance from the rotational axis during a motion of the frame elements relative to one another, the opening may have a certain aperture angle at the rear, for example. Contact is thus avoided or minimized between the cable and the opening, i.e., the frame element.

According to another exemplary embodiment of the invention, the first surface of the second opening is selected from the group comprising a cylindrical surface and a conical surface.

It is also possible for the surface of the second opening to represent a portion of the envelope of a cone. As a result of these various surface shapes, the deflection of the line in the second moving region of the line, which increases from the rotational axis, may be compensated for in such a way that no contact results between the inner wall of the opening and the line per se.

According to another exemplary embodiment of the invention, the frame element also has an insert. The insert is designed for insertion into the second opening. In addition, a second surface of the insert has a shape such that contact between the line and the second surface is avoided during a motion of the frame element relative to the additional frame element. The insert may be designed as a guide tube, for example, which is inserted in a guide channel which may extend, for example, through a seat tube and the fastening element. This insert may be made of plastic or metal, for example. Combinations are also possible. In addition, this guide tube may have a conical or trumpet-shaped first end, which is located at the second opening when the insert is introduced. Furthermore, the insert is designed for guiding the line inside the insert. In other words, the line is introduced into the insert, and the insert in turn is inserted into the second opening. The insert may span free areas between a seat tube and a fastening element, for example, so that a line is continuously guided in a protected manner from a first opening in the seat tube to the second opening in the fastening element. After the guiding through the rotational axis or at a distance of up to 10 or 15 mm from the rotational axis, at the end of the insert the line exits the insert and the fastening element.

Here as well, it is a key aspect of this exemplary embodiment that the second surface of the insert has an aperture angle such that during a motion of the line, which is brought about by an average motion of the two frame elements relative to one another, no contact results between the line and the second surface.

According to another exemplary embodiment of the invention, the second surface is selected from the group comprising a cylindrical surface and a conical surface.

The second surface may also be part of the envelope of a cone. An aperture angle of the insert may be selected as a function of the diameter of the second opening.

According to another exemplary embodiment of the invention, the insert is also designed for passing through at least one of the two openings. In addition, the insert extends from the first opening to the second opening.

In other words, it is possible, for example, to introduce a guide tube as an insert into the frame element, from the first opening in the seat tube to the second opening in the fastening element. Linear or also nonlinear guiding of the line may result.

By means of this guide tube, the line is guided in such a way that it intersects the rotational axis of the bearing or passes the rotational axis at a distance of 0 to 10 mm.

According to another exemplary embodiment of the invention, a bicycle having a frame element according to one of the preceding exemplary embodiments is provided.

According to another exemplary embodiment of the invention, the bicycle has the cable and the bearing.

According to another exemplary embodiment of the invention, a method for mounting and guiding a cable on a frame element of a suspension-mounted two-wheeled vehicle frame is provided. The method has the following steps: Providing a frame element with a guide device for guiding the cable; mounting an additional frame element on the frame element by a bearing, the mounting being carried out in such a way that the frame element is able to undergo a relative motion with respect to the second frame element; and guiding the cable through guide device, the guiding being carried out in such a way that in the guided state, the distance of an outer surface of the cable from a rotational axis of the bearing is between 0 and 10 mm.

With the aid of the method according to the invention, it is possible to lay a line or cable on a suspension-mounted two-wheeled vehicle frame in such a way that relative motion between the frame element and the additional frame element does not cause elongation of the line or mechanical abrasion in the region of the fastening element.

In addition, it is pointed out that the words "including" and "having" do not exclude other elements or steps, and "a" or "an" do not exclude a plurality. It is further pointed out that features or steps which have been described with reference to one of the above exemplary embodiments may also be used in combination with other features or steps of other exemplary embodiments of the invention described above. Reference numerals in the claims are not to be construed as limiting.

Exemplary embodiments of the invention are described below with reference to the figures.

BRIEF DESCRIPTION OF THE FIGURES

The same reference numerals are used for identical or similar elements in the following description of the figures.

The illustrations in the figures are schematic and are not to scale.

DETAILED DESCRIPTION OF THE EXEMPLARY EMBODIMENTS

Figure 1:
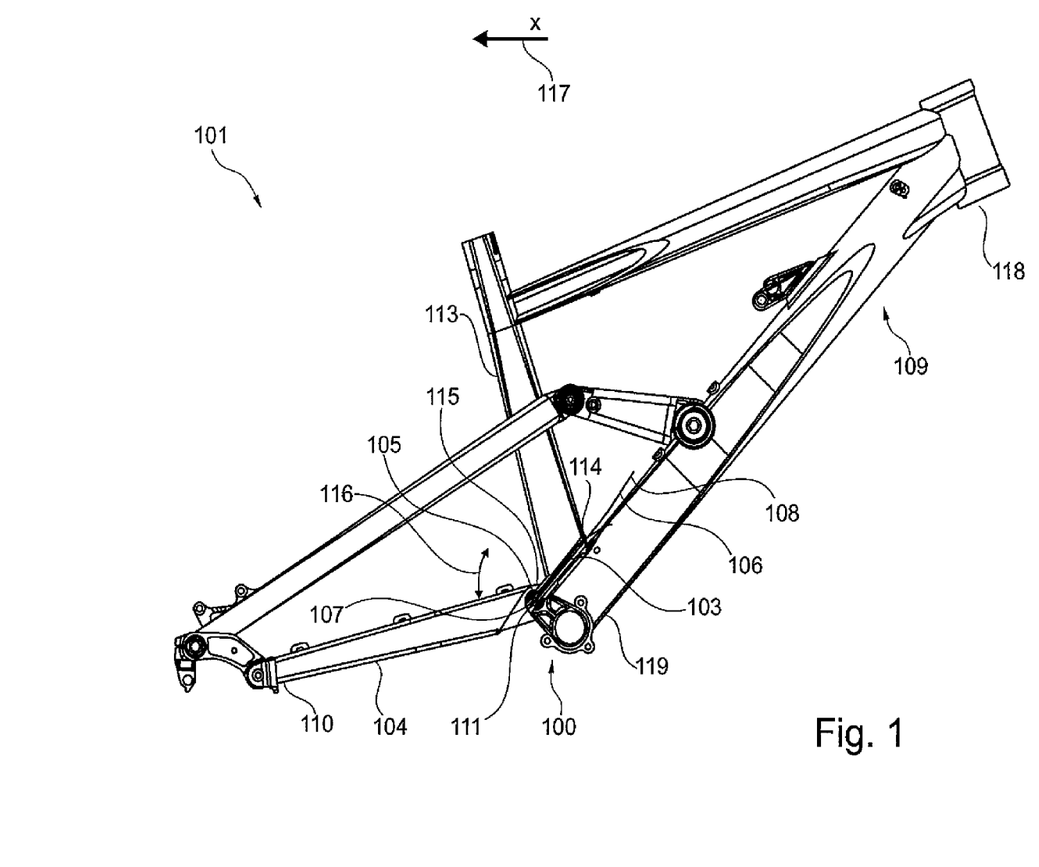
FIG. 1 shows a schematic two-dimensional illustration of a partial section of a suspension-mounted two-wheeled vehicle frame, having a frame element according to an exemplary embodiment of the invention.

FIG. 1 shows a frame element 100 of a suspension-mounted two-wheeled vehicle frame 101 for guiding a cable or line 108. Also shown is the additional frame element 104, which is movably mounted on the frame element 100 by a bearing 105. The motion which is thus made possible is indicated by arrow 116. In addition, the cable 108 has an outer surface 106. It is apparent from FIG. 1 that the line 108 is guided through an opening 114 in the seat tube 113. The guiding is carried out in such a way that, in this guided state shown, the distance of the outer surface of the line from the rotational axis 107 of the bearing 105 is between 0 and 10 mm. Elongation of the line may thus be avoided or reduced when a motion of the frame element 100 relative to the additional frame element 104 takes place. In addition, reference numeral 117 denotes the x axis, which extends from the front region of the two-wheeled vehicle frame, shown in the right part of the illustration in FIG. 1, to the rear region of the two-wheeled vehicle frame. The rear region is shown in the left part of the illustration. Thus, the front region of the front end 109 of the two-wheeled vehicle frame is shown, which includes a steering tube 118, among other elements. Also shown is the rear end together with the swing arm 110, the swing arm representing the additional frame element 104.

In this exemplary embodiment of the invention, the frame element according to the invention is represented by the seat tube 113 and the down tube 119, which has a fastening element 115 on which the bearing 105 is mounted. In the present exemplary embodiment, the fastening element is referred to as a swing arm holder. In other words, the swing arm is mounted in a rotatably supported manner on the swing arm holder. The line is guided along through the rotational axis 107 of this bearing, respectively at a distance of up to 10 mm from this rotational axis.

Due to the guiding of the line through the region according to the invention, which extends around the rotational axis with a radius of up to 10 mm (the rotational axis being regarded as the midpoint of this circle), it may be achieved that no elongation of the line is caused by a motion of the line brought about by a motion 116 of the frame elements.

Figure 2:
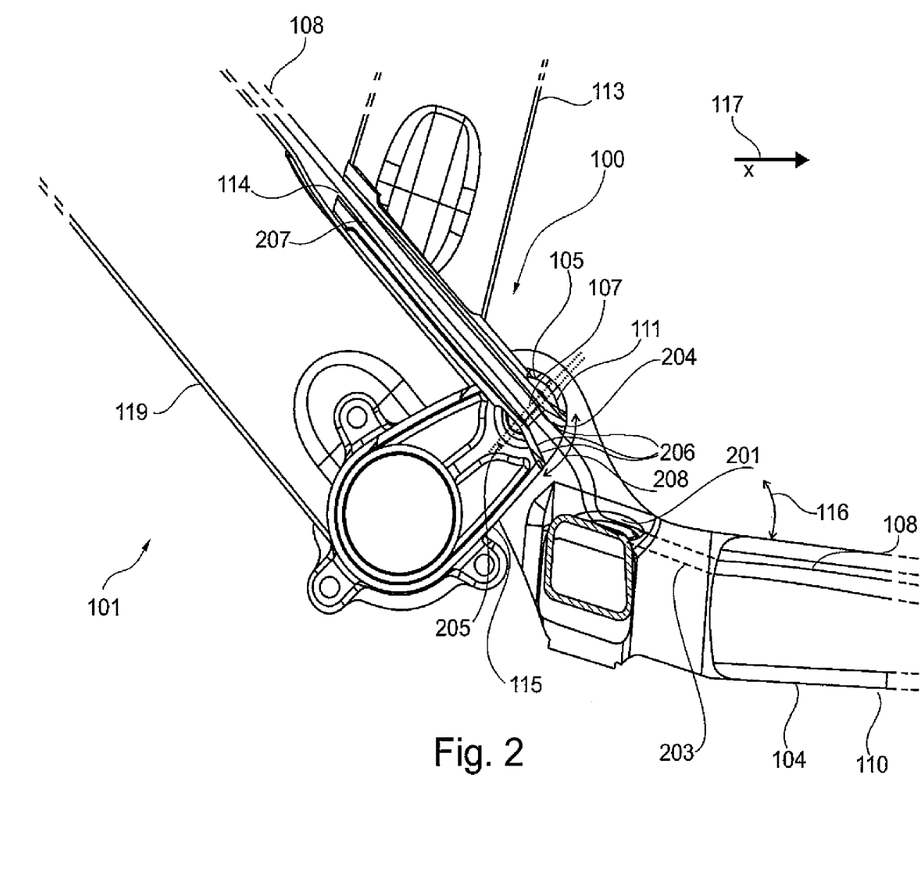
FIG. 2 shows another schematic three-dimensional illustration of a partial section of a suspension-mounted two-wheeled vehicle frame, having a frame element according to an exemplary embodiment of the invention.

FIG. 2 shows another exemplary embodiment of the invention. A frame element 100 of a suspension-mounted two-wheeled vehicle frame 101 is shown. The frame element includes the down tube 119, the seat tube 113, and the fastening element 115. The fastening element may, for example, be welded to the down tube. In addition, the line 108 is shown in the guided position, a guide channel 207 extending in the seat tube and in the fastening element 115. This guide channel 207 is designed in such a way, for example, that an insert, described in greater detail in the following FIGS. 3 and 6, may be introduced.

A relative motion 116 between the frame element 101 and the additional frame element 104 may be enabled as a result of the bearing 105, which has a rotational axis 107 that is illustrated here as a point in the top view. The additional frame element is designed as a swing arm 110, on which a first channel opening 201 is visible at which a channel 203 for guiding the line or cable 108 begins. The channel ends at the second channel opening (not shown). In addition, the first opening 114 in the seat tube 113 is shown, at which a guide channel 207 is provided inside the frame element 101. The guiding of the line beneath the surface of the frame element, which is thus not visible to an observer, is carried out in this manner. This may protect the line from mechanical effects as well as weather influences.

At the end of the channel 207 the second opening 204 in the fastening element 115 is shown, which is located at a distance 205 from the rotational axis and which may be selected from a group comprising 0 to 10 mm, 10 to 20 mm, and 20 to 30 mm. The distance is indicated by arrow 205. It is also clearly apparent that a first surface 206 of the second opening 204 has a conical design. In other words, the opening 204 in the direction of the rear region of the two-wheeled vehicle frame has an aperture angle which allows contact to be avoided between the line 108 and the surface 206 during a motion 116 of the two frame elements. The aperture angle is indicated by arrow 208. The rear region is on the right side in FIG. 2.

Mechanical abrasion of the frame in the region of the opening 204 at the frame or the line, resulting from the motion of the two frame elements 101 and 104 relative to one another, may thus be avoided. In addition, the x axis is denoted by reference numeral 117.

Figure 3:
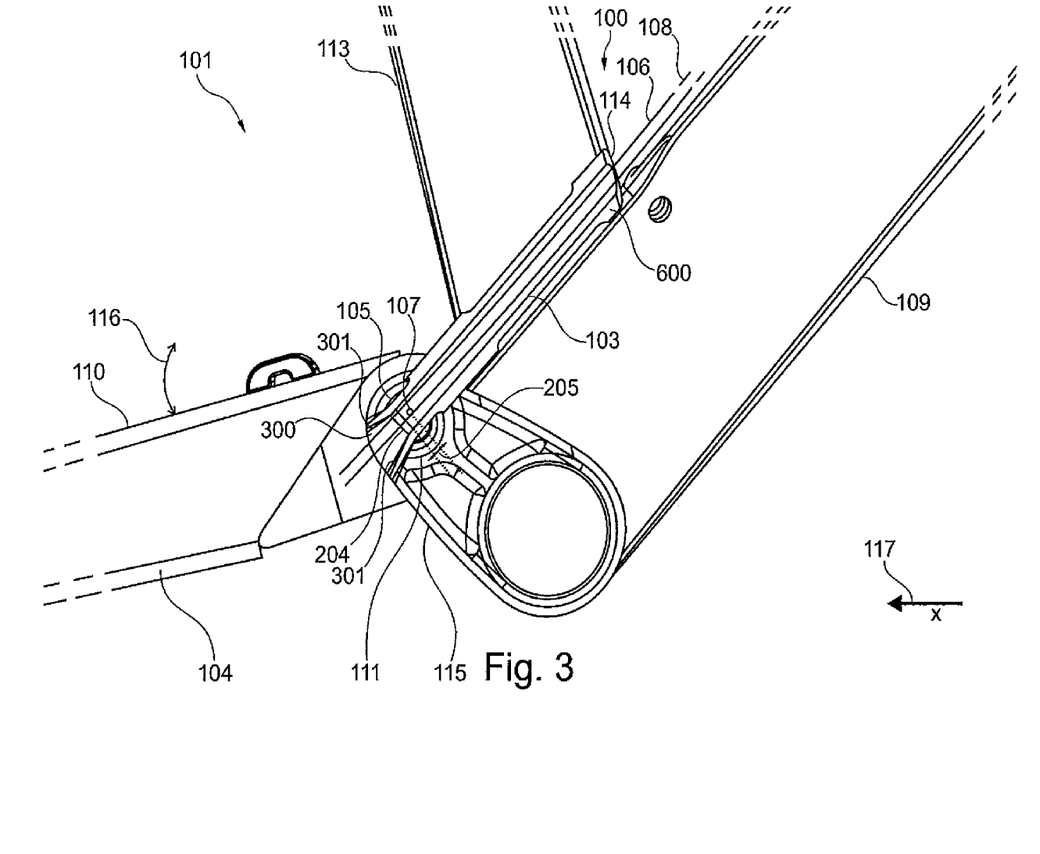
FIG. 3 shows another schematic three-dimensional illustration of a partial section of a suspension-mounted two-wheeled vehicle frame, having a frame element according to an exemplary embodiment of the invention.

FIG. 3 shows another exemplary embodiment of the frame element 100. A front end 109 of a suspension-mounted two-wheeled vehicle frame 101 is mounted in a rotatably supported manner on a swing arm 110. The swing arm 110 acts as an additional frame element 104 which is able to undergo a motion 116 due to the bearing 105. Also shown is the rotational axis 107 of the bearing 105, which extends perpendicular to the plane of the drawing. In addition, a guide device 103 is shown, which is illustrated here as an insert 600 which is introduced into the guide channel that extends along the inside of the seat tube and the fastening element. This insert may be placed in the first opening 114 in the seat tube 113. The insert 600 runs along the channel due to a borehole, for example, at that location, inside the entire seat tube within the entire fastening element 115. At a first end 300 the insert has a conical or trumpet-shaped opening 301. The contour of the insert 600 in this region of the end 300 may be adapted to the contour of the opening 204. For example, the outer surface of the insert in this region 300 may rest against the inner wall of the opening 204. A positive-fit design is also possible.

In other words, by means of the insert 600 a channel is provided for the line 108, by means of which the line is guided. The guiding is carried out in such a way that in the guided state, the distance of the outer surface 106 of the line from the rotational axis of the bearing is between 0 and 10 mm. Elongation of the line beyond a desired degree may thus be prevented. The first part 111 of the two-part bearing 105 is clearly apparent in this side view. In addition, the x axis is denoted by reference numeral 117, analogously to FIGS. 1 and 2.

Figure 4:
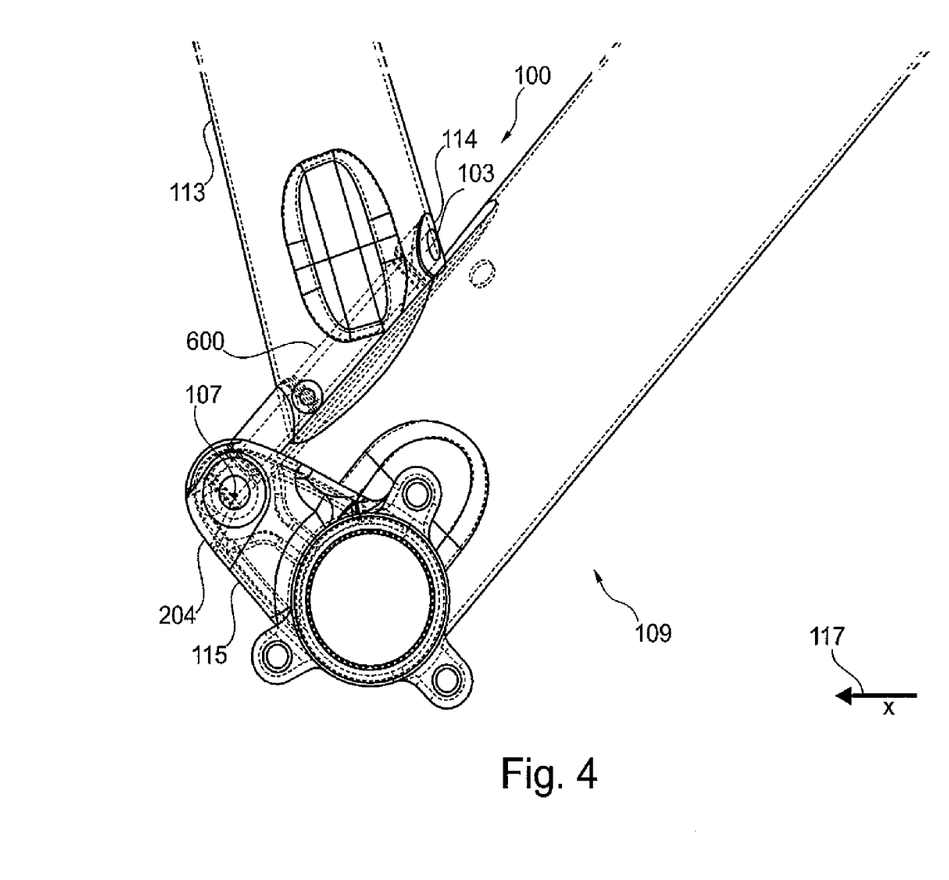
FIG. 4 shows another schematic three-dimensional illustration of a frame element according to an exemplary embodiment of the invention.

FIG. 4 shows a front end 109 of a suspension-mounted two-wheeled vehicle frame having a frame element 100. A seat tube 113 having an opening 114, and a fastening element 115 having a second opening 204 are shown. An insert 600 extends from the first opening 114 to the second opening 204, and provides a guide device 103 for guiding the line. The line is guided in such a way that in the guided state, the outer surface of the line intersects a circle having a radius of up to 10 mm which intersects the rotational axis 107. In addition, the x axis is denoted by reference numeral 117.

Figure 5:
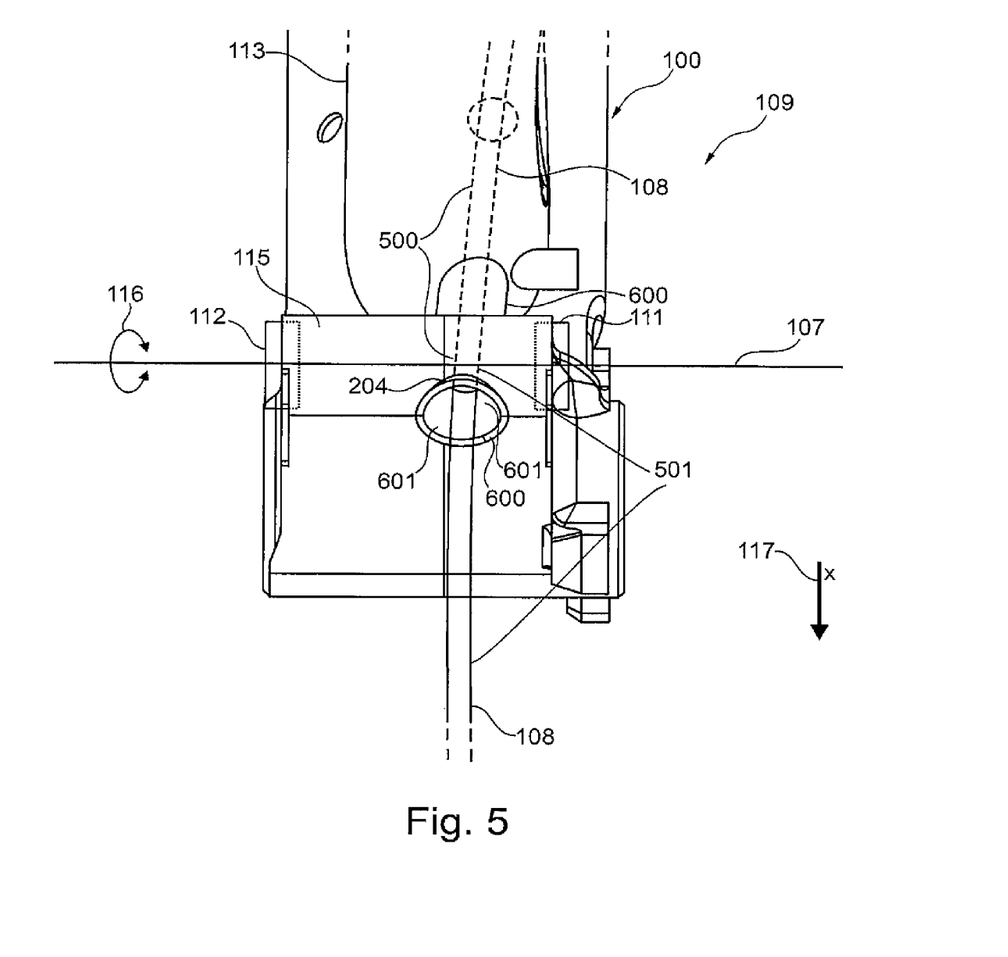
FIG. 5 shows a schematic three-dimensional rear view of the second opening on a frame element according to an exemplary embodiment of the invention.

FIG. 5 shows a rear view of the second opening 204, from which the line 108 comes out of the fastening element 115, which is part of the frame element 100. Also shown is a two-part main bearing of the swing arm, having a first part 111 and a second part 112. A cavity is present between the two parts, through which the line 108 may be easily guided. The insert 600 is also shown, which as a guide tube guides the line through the seat tube 113 and through the fastening element 115. The fastening element is designed in such a way that the rear end of a bicycle may be mounted in a rotatably supported manner by means of the bearings 111 and 112. The rotational axis is denoted by reference numeral 107. In this view it is apparent that the line 108 may be divided into a first region 500 and a second region 501. The second region 501 is the part of the line which extends from the rotational axis 107 to the rear end of the two-wheeled vehicle frame (in the present view, in the direction of the lower edge of the figure). The first region 500 extends between the seat tube 113 and the rotational axis. The rear end of the two-wheeled vehicle frame is not shown here, but is located at the lower end of the figure. The second region of the line 501 is the part in which motion is caused when the swing arm moves. Motion of the line in the first region 500 may be avoided due to the guiding and conducting of the line according to the invention.

The insert 600 also has a second surface 601, this surface having a shape such that contact between the line and the second surface is avoided during a motion 116 of the frame element relative to the additional frame element (not shown). In addition, the x axis is denoted by reference numeral 117.

Figure 6:
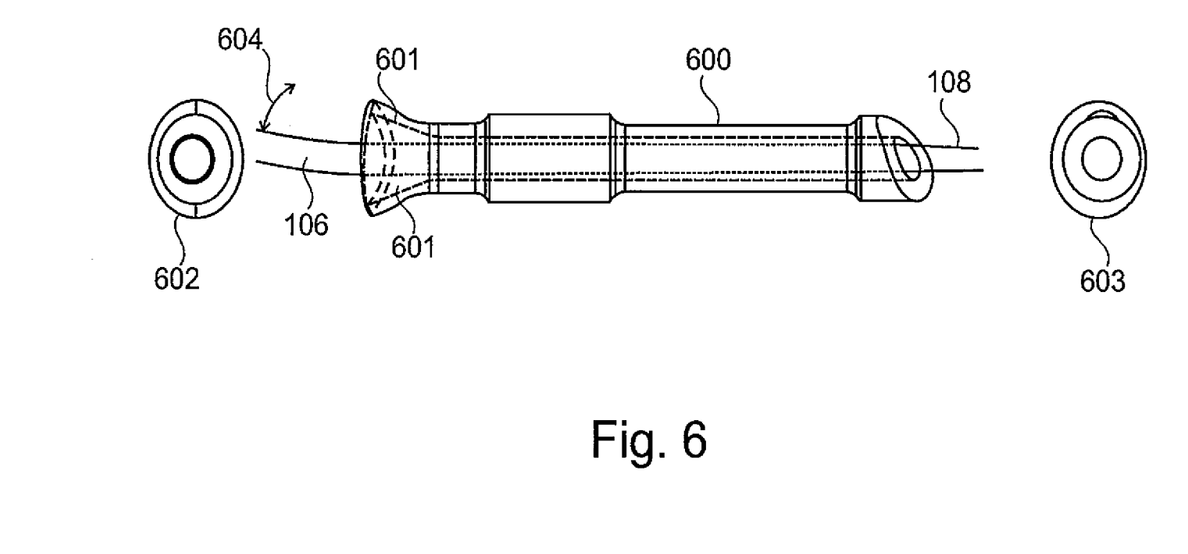
FIG. 6 shows a schematic three-dimensional illustration of an insert according to an exemplary embodiment of the invention.

FIG. 6 shows the insert 600, having a second surface 601 and an inner channel through which the line 108 having the surface 106 may be guided. The second surface is, for example, a conical surface or has the shape of a portion of the envelope of a cone. Due to this trumpet-shaped opening in the insert 600, a motion 604 of the line which is caused by a motion 116 (not shown) of the two frame elements relative to one another may be compensated for in such a way that no contact results between the surface 601 and the line surface 106.

Top views of the two ends of the insert 600 are denoted by reference numerals 602 and 603, respectively, and clearly show the channel for guiding the line 108 through.

Figure 7:
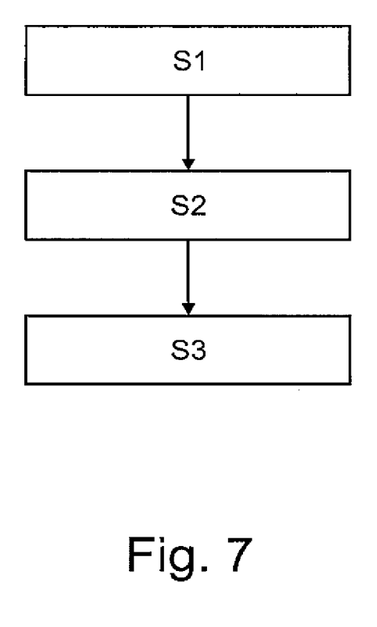
FIG. 7 shows a flow diagram of method steps according to an exemplary embodiment of the invention.

FIG. 7 shows a method for mounting and guiding a line on a frame element of a suspension-mounted two-wheeled vehicle frame, a frame element having a guide device for guiding the line being provided in a first step S1. In a second step an additional frame element is mounted on the frame element by means of a bearing. The mounting is carried out in such a way that the frame element is able to undergo a relative motion with respect to the second frame element. The line is guided through the guide device in a third step (S3). The guiding through is carried out in such a way that in the guided state, the distance of an outer surface of the line from a rotational axis of the bearing is between 0 and 10 mm. As a result of this fastening and guiding of the line according to the invention by this method, deflection of the line due to a motion of the two frame elements relative to one another, and/or abrasion due to motions of the lines on the frame, may be prevented.

The invention claimed is:

1. A frame element of a suspension-mounted two-wheeled vehicle frame for guiding a cable on the two-wheeled vehicle frame, wherein the frame element is a front end of the suspension-mounted two-wheeled vehicle frame having:
    a guide device for guiding the cable on the two-wheeled vehicle frame;
    wherein the frame element is designed for the movable mounting of a swing arm of the suspension-mounted two-wheeled vehicle frame by a bearing;
    wherein the bearing is a two-part main bearing of the swing arm, and has a first part and a second part;

wherein the guiding of the cable takes place between the first part and the second part of the main bearing;
wherein the cable has an outer surface; and
wherein when the cable is guided between the first part and the second part of the main bearing, a distance of the outer surface of the cable from a rotational axis of the bearing is between 0 mm and 10 mm.

2. A bicycle having a frame element according to claim 1.

3. The bicycle according to claim 2, further having:
the cable; and
the bearing.

4. The frame element according to claim 1, wherein the swing arm has two channel openings and a channel;
wherein the channel extends between the two channel openings; and
wherein the channel is designed for guiding the cable.

5. A frame element of a suspension-mounted two-wheeled vehicle frame for guiding a cable on the two-wheeled vehicle frame, wherein the frame element is designed for the movable mounting of an additional frame element by a bearing and the bearing is a two-part main bearing of the additional frame element, and has a first part and a second part, the frame element having:
a seat tube having at least one first opening;
a fastening element for mounting the bearing to the suspension-mounted two-wheeled vehicle frame; wherein the fastening element has at least one second opening; and
a guide device for guiding the cable on the two-wheeled vehicle frame;
wherein the guiding of the cable takes place between the first part and the second part of the main bearing;
wherein the cable has an outer surface; and
wherein when the cable is guided between the first part and the second part of the main bearing, a distance of the outer surface of the cable from a rotational axis of the bearing is between 0 mm and 10 mm; and
wherein when the cable is guided, the cable extends through the first opening in the seat tube and the second opening in the fastening element.

6. The frame element according to claim 5, wherein the second opening is designed for the cable to exit from the fastening element.

7. The frame element according to claim 6, further having:
an insert;
wherein the insert is designed for insertion into the second opening; and
wherein a surface of the insert has a shape such that contact between the cable and the surface of the insert is avoided during a motion of the frame element relative to the additional frame element.

8. The frame element according to claim 7, wherein the surface of the insert is selected from the group comprising a cylindrical surface and a conical surface.

9. The frame element according to claim 7, wherein the insert is also designed for passing through at least one of the first and second openings; and
wherein the insert extends from the first opening to the second opening.

10. The frame element according to claim 6, wherein a first surface of the second opening has a shape such that contact between the cable and the first surface is avoided during a motion of the frame element relative to the additional frame element.

11. The frame element according to claim 10, wherein the first surface is selected from the group comprising a cylindrical surface and a conical surface.

12. The frame element according to claim 6, wherein a distance of the second opening from the rotational axis is selected from the group comprising 0 mm to 10 mm, 10 mm to 20 mm, and 20 mm to 30 mm.

* * * * *